UNITED STATES PATENT OFFICE.

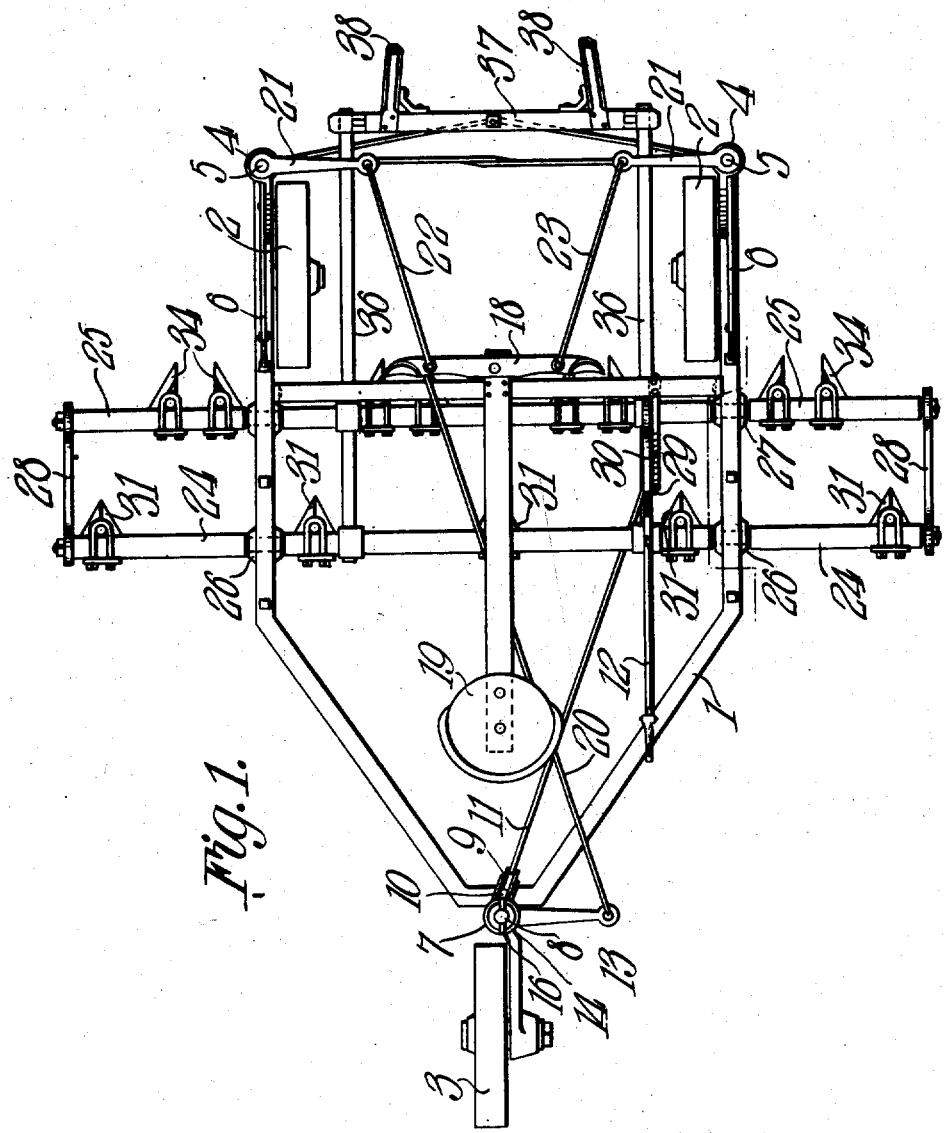

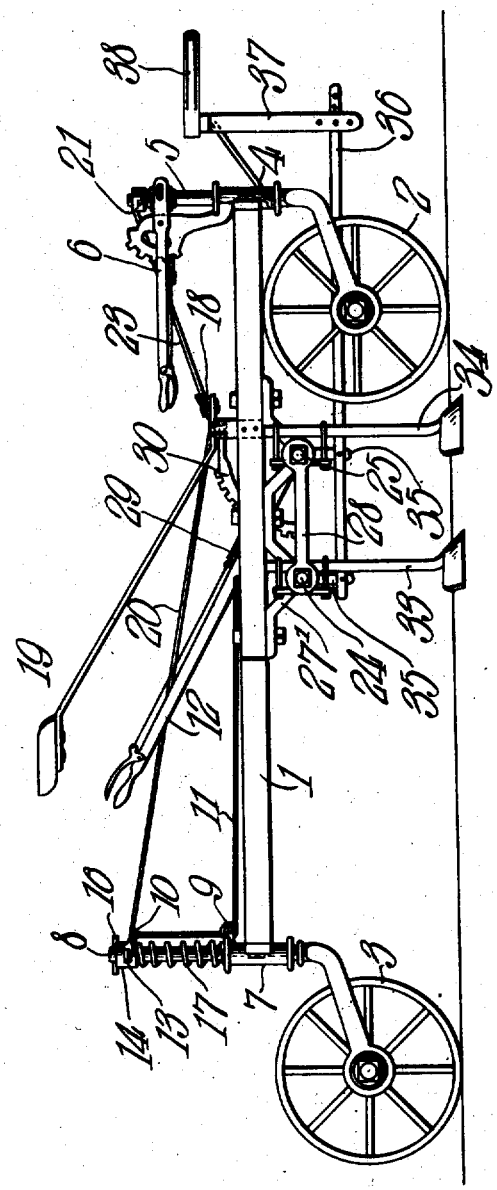

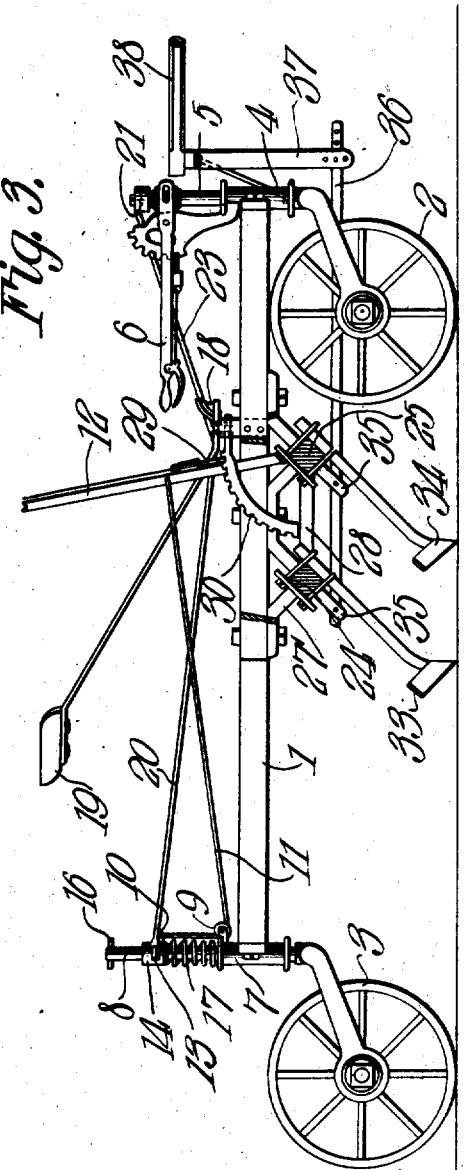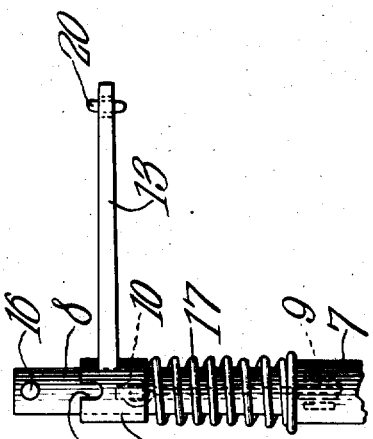

IRVIN SCHUCKMAN, OF GARDEN CITY, KANSAS.

BEET-CULTIVATOR.

No. 901,387.  Specification of Letters Patent.  Patented Oct. 20, 1908.

Application filed November 30, 1907. Serial No. 404,604.

*To all whom it may concern:*

Be it known that I, IRVIN SCHUCKMAN, a citizen of the United States, residing at Garden City, in the county of Finney and State of Kansas, have invented a new and useful Beet-Cultivator, of which the following is a specification.

This invention has relation to beet cultivators and it consists in the novel construction and arrangement of its parts as hereinafter shown and described.

The object of the invention is to provide a cultivator of the character indicated which is adapted to operate upon a series of rows of plants simultaneously and which is provided with a simple and effective means for steering the implement along the rows of plants.

With the above object in view the machine consists of a frame mounted upon dirigible caster wheels and a foot lever mechanism operatively connected with the spindles of the casters of said wheels for turning the same. A pair of beams is journaled in the frame and each beam is provided with ground engaging members. Means is provided for turning the said beams axially whereby the ground engaging members may be elevated with relation to the ground and means is also provided for liberating the spindle of the rear caster wheel when the said beams are turned whereby the implement may be readily turned around at the end of the row. Means is provided for moving the ground engaging members into engagement with the ground which means is operated directly from the draft of the draft animals attached to the implement.

Figure 1 is a top plan view of the beet cultivator. Fig. 2 is a side elevation of the same showing the standards in one position. Fig. 3 is a side elevation of the same with parts in section showing the standards in another position, and Fig. 4 is a detail side elevation of the upper portion of one of the caster spindles used on the cultivator.

The implement consists of the frame 1 which is supported at its forward end by the caster wheels 2 and at its rear end by the caster wheel 3. The forward corners of the frame 1 are provided with the sleeves 4 in which are journaled the spindles 5 of the casters carrying the wheels 2. A lever mechanism 6 is provided for shifting the spindles 5 longitudinally with relation to the sleeves 4 whereby the forward end of the frame 1 may be readily adjusted with relation to the surface of the ground. The rear end of the frame 1 is provided with a vertically disposed sleeve 7 in which the spindle 8 of the caster of the wheel 3 is journaled and in which the said spindle may move longitudinally. The pulley 9 is mounted upon the sleeve 7 and the eye 10 is mounted upon the collar 14. The cable 11 passes under the pulley 9 and attaches with the eye 10 at its rear end. The forward end of the cable 11 is attached to the lever 12 which is fulcrumed upon the frame 1. The upper end of the spindle 8 is provided with an arm 13 which is provided with a collar 14 which receives the spindle 8. The said collar is provided in its upper side with a recess 15 which is adapted to receive the pins 16 mounted upon the spindle 8. The eye 10 is attached to the collar 14 and coil spring 17 is interposed between the upper end of the sleeve 7 and the lower side of the collar 14 and is under tension to hold the recess 15 in engagement with the pin 16. The trip lever 18 is fulcrumed on the frame 1 in advance of the operator's seat 19. The link 20 is pivotally attached at its forward end to the lever 18 and at its rear end to the arm 13. The upper end of each of the spindles 5 is provided with an arm 21. The link 22 is pivotally connected at its forward end to one of the arms 21 and at its rear end to the lever 18 at substantially the same point of connection therewith as that between the link 20 and the said lever. The forward end of the link 23 is pivotally connected to the other arm 21 and its rear end is pivotally connected to the lever 18 upon the opposite side of the fulcrum point thereof from the point of connection between the link 22 and said lever. The beams 24 and 25 are journaled in the bearings 26 and 27 respectively, provided in the depending brackets 27' of the frame 1. Said beams are parallel to each other and are connected together at their outer ends by the links 28. The lever 12 is mounted upon the beam 25 and carries a spring actuated pawl 29 which engages the gear segment 30 attached to the frame 1. The ground engaging members 33 are attached to the beam 24 while the ground engaging members 34 are attached to the beam 25. The beams 24 and 25 are also provided with the depending arms 35 to which are pivotally attached the rear end portions of the draft rods 36. The forward ends of the said draft rods are pivotally connected to the superstructure 37 which, in turn, is attached to the shafts 38 or a tongue corresponding to said shafts.

The operation of the implement is as follows: As it is drawn along the rows of plants the operator manipulates the lever 18 with his feet which through the links 20, 22 and 23 and the attached arms turn the caster spindles 5 and 8 axially which swings the wheels 2 and 3 whereby the implement may be properly directed with relation to the standing plants. When the row is reached the lever 12 is swung forward which turns the beams 24 and 25 axially. Thus, the ground engaging members 33 and 34 are swung to the rear and elevated out of the ground. At the same time the forward movement of the lever 12 draws upon the cable 11 and the eye 10 located upon the collar 14 is drawn toward the eye 9. Thus, the recess 15 is disengaged from the pin 16 and the spindle 8 is free to turn irrespective of the lever 18 and its connection. Thus by loosening the caster at the rear end of the frame 1 and at the ends of the rows the machine may be readily turned to pass back across the field. When the machine assumes its proper alinement with relation to a new set of rows the lever 12 is swung to the rear when the coil spring 17 will cause the recess 15 of the collar 14 to receive the pin 16 and at the same time the strain of the draft animals operating through the shafts 38, structure 37 and draft rods 36 will pull the arms 35 positively toward the front which will cause the shafts 25 and 24 to rotate axially whereby their respective ground engaging members will be forced into the ground.

Having described my invention what I claim as new and desire to secure by Letters-Patent is:—

1. In a device of the kind described, a frame supported on a trinity of caster wheels, steering elements for simultaneously and equally changing the angular relation of said wheels to the frame, digging members mounted adjustably for height on said frame, and means to simultaneously lift said digging members and release one of said wheels from its steering element.

2. In a device of the kind described, a frame supported on a forward pair of caster-wheels and a single rear caster wheel, steering elements for simultaneously and equally changing the angular relation of all said wheels to the frame, means for independently adjusting the height of the two front wheels, digging members mounted adjustably for height on said frame, and means to simultaneously lift said digging members and release the rear wheels from said steering elements.

3. In a device of the kind described, a frame, supported on a trinity of caster wheels, steering elements for simultaneously and equally changing the angular relation of said wheels to the frame, a clutch arranged to releasably connect one of said wheels to the steering elements, digging members mounted adjustably for height on said frame, and a latch lever connected to said digging members and the clutch arranged to simultaneously lift the digging members, release the clutch, and free said wheel from said steering elements.

In testimony that I claim the foregoing as my own, I have hereto affixed my signature in the presence of two witnesses.

IRVIN SCHUCKMAN.

Witnesses:
J. J. TUTWILER,
I. J. CARTER.